United States Patent Office 3,304,327
Patented Feb. 14, 1967

---

3,304,327
2,4-DISUBSTITUTED CARBOHYDRAZIDES
Leo A. Rapaelian, West Haven, Gerhard F. Ottmann, Hamden, and Haywood Hooks, Jr., West Haven, Conn., assignors to Olin Mathieson Chemical Corporation, New Haven, Conn., a corporation of Virginia
No Drawing. Filed Mar. 2, 1966, Ser. No. 531,034
12 Claims. (Cl. 260—554)

This invention relates to 2,4-disubstituted carbohydrazides, and more particularly it relates to compounds having the general formula:

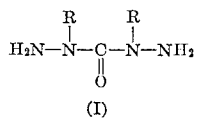

(I)

wherein each R is independently selected from the class consisting of alkyl, aryl, and substituted aryl; or in which the R substituents, taken together, represent an alkylene moiety.

Carbohydrazide itself is a known compound, but previous attempts to provide 2,4-disubstituted carbohydrazides have been unsuccessful. For instance, reaction of dialkyl carbonates with substituted hydrazines (e.g., methylhydrazine) did not provide the desired compounds. Similarly dimethyl urea has been reacted with nitrous acid in an attempt to provide 2,4-dinitroso carbohydrazide for subsequent conversion to 2,4-dimethyl carbohydrazide, but the desired dinitroso derivative was not obtained.

Therefore, the principal object of this invention is to provide compounds of the Formula I. Another object of this invention is to provide a convenient and efficient process for the preparation of 2,4-disubstituted carbohydrazides in high purity and yield.

These objects have been accomplished in accordance with this invention. The 2,4-disubstituted carbohydrazides I are provided in accordance with the disclosure herein. A convenient process is provided for the preparation of the compounds I in high purity and yield.

The starting reactants utilized in the practice of this invention are monosubstituted hydrazines and phosgene as well as N-monosubstituted hydrazones or N,N'-disubstituted α,ω-dihydrazino alkane bis(azines). The latter two classes of compounds are readily provided by methods known to those skilled in this art as for example disclosed in Houben-Weyl, Methoden der Organischen Chemie, fourth edition, 1954. Thus, the reaction of carbonyl compounds such as aldehydes and ketones with monosubstituted hydrazines or alkylene dihydrazines proceeds in accordance with the following equations wherein N-monosubstituted hydrazones II and N,N'-disubstituted α,ω-dihydrazino alkane bis(azines) III are provided.

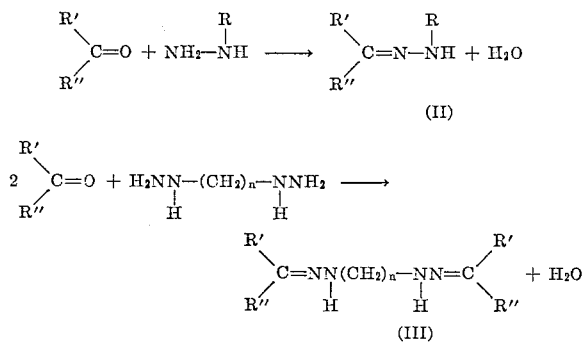

Any aldehyde or ketone may be employed in the preparation of the starting reactants II and III as long as they do not contain any substituent which interferes with the reaction of the hydrazines. Thus R' in the above equations represents an aliphatic, aromatic or heterocyclic moiety which is attached to the carbonyl group, while R" may represent hydrogen as well as the aforementioned moieties. The

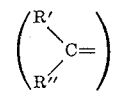

group serves as a blocking group during the preparation of the 2,4-disubstituted carbohydrazides, and the aldehyde or ketone is substantially recovered during the preparation of the compounds I. Thus a wide variety of aldehydes and ketones may be employed in the preparation of the starting reactants. Included among the aldehydes which may be employed are: acetaldehyde, propionaldehyde, n-butyraldehyde, isobutyraldehyde, n-valeraldehyde, n-capronaldehyde, n-heptaldehyde, benzaldehyde, furfuraldehyde and the like. Among the ketones which may be employed in the preparation of the starting materials are: acetone, methylethyl ketone, diethyl ketone, acetophenone, propiophenone, benzophenone, and the like. The use of water-insoluble aldehydes or ketones (e.g., benzaldehyde) in the preparation of compounds having the general Formulas II and III is preferred since these materials are easier to recover during the preparation of the compounds I.

Monosubstituted hydrazines which may be utilized as reactants in the practice of this invention have the general formula NH$_2$NHR wherein R represents alkyl, aryl or substituted aryl. Thus, substituted hydrazines wherein R represents alkyl having 1–8 (and preferably 1–4) carbon atoms, aryl having 6–10 carbon atoms, halogenated phenyl and nitrated phenyl can be utilized in preparing the compounds I. Among the preferred substituted hydrazines are monomethylhydrazine, monoethylhydrazine and phenylhydrazine.

Alkylene hydrazines used in the preparation of the N,N'-disubstituted α,ω-dihydrazino alkane bis(azines) are preferably those having 2–4 carbon atoms such as ethylene dihydrazine, propylene dihydrazine and tetramethylene dihydrazine. These reactants are readily available by the reaction of hydrazine hydrate with alkylene dihalides as for example disclosed in U.S. Patent 2,822,354.

Thus the compounds I are provided in accordance with this invention by reacting N-monosubstituted hydrazones with phosgene to provide an N-chlorocarbonyl-N-monosubstituted hydrazone, further reacting this chlorocarbonyl derivative with a monosubstituted hydrazine to provide a 2,4-disubstituted carbohydrazide monoazine, hydrolyzing the monoazine in an acidic medium to provide a salt of 2,4-disubstituted carbohydrazide and treating said salt with base to provide the compounds I.

The following equations will serve to illustrate the above reaction sequence wherein benzaldehyde methylhydrazone is employed as a starting reactant although any other N-monosubstituted hydrozone can be similarly employed.

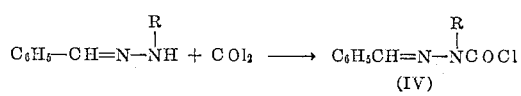

(IV)

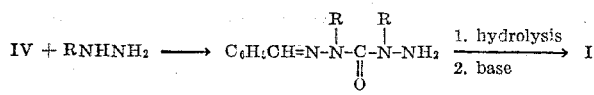

Reaction of the N-monosubstituted hydrazones with phosgene to provide the N-chlorocarbonyl intermediates is performed at a temperature range of about −50° C. to 10° C. and preferably at 0°–10° C. This reaction is strongly exothermic, and the reaction temperature is suitably controlled by external cooling means. The use of an inert diluent is also useful in controlling the vigorous exotherm, and included among the many suitable diluents which may be employed are aliphatic and aromatic hydrocarbons such as hexane, benzene, toluene, the xylenes, and the like. Ethers, e.g., diethyl ether, are also conveniently employed as diluents in this reaction. Hydrogen chloride is formed during the reaction with phosgene, but an excess of the N-monosubstituted hydrazone may be utilized to function as a hydrogen chloride acceptor. Alternatively other organic bases may be employed as acceptors. For instance, tertiary amines such as triethylamine are particularly useful. The N-chlorocarbonyl-N-monosubstituted hydrazones are conveniently isolated by, for example, filtration or centrifugation procedures from the reaction mixture, and they are purified by conventional recrystallization procedures from appropriate solvents (e.g., hexane).

Further reaction of the N-chlorocarbonyl-N-monosubstituted hydrazones with monosubstituted hydrazines is performed at a temperature of about 10° C. to about 100° C. An inert diluent is conveniently utilized in this reaction step, and suitable inert diluents include those mentioned in the preceding discussion. This process step is preferably carried out at reaction temperatures of about 10°–40° C. Hydrogen chloride is also formed during this reaction, but an excess of the monosubstituted hydrazine may be employed as an acid acceptor itself or other acid acceptors such as tertiary amines (e.g., triethylamine) may be employed. The resulting, 2,4-disubstituted carbohydrazides monoazines are readily isolated by filtration or centrifugation procedures and by solvent removal. These materials are then hydrolyzed in an acidic medium. Suitable acids which may be employed in this hydrolysis step are the commonly employed mineral acids such as hydrochloric, sulfuric, phosphoric, and the like. Organic acids such as acetic acid may also be employed in aqueous medium as the hydrolyzing acids. This hydrolysis step is conveniently carried out by heating the monoazine in an acidic aqueous medium, and most conveniently hydrolysis occurs at a reaction temperature of about 70°–120° C. (steam). A salt of 2,4-disubstituted carbohydrazide and the acid used in the hydrolysis step is thus provided which, upon treatment with an appropriate base, i.e., alkali metal or alkaline earth metal hydroxides and the like, results in the desired products I.

It has been found that above 10° C., the N-chlorocarbonyl-N-monosubstituted hydrazone intermediates (such as exemplified by IV) also react appreciably with the hydrazone starting reactants to provide 2,4-disubstituted carbohydrazide bis(azines) which are readily converted to the compounds I. Thus an alternate process for the preparation of 2,4-disubstituted carbohydrazides is also provided herein. This process comprises reacting either N-monosubstituted hydrazones (II) or N,N'-disubstituted α,ω-dihydrazino alkane bis(azines) (III) with phosgene above 10° C. to provide 2,4-disubstituted carbohydrazide bis(azines), hydrolyzing the bis(azines) in an acidic medium to provide a salt of 2,4-disubstituted carbohydrazide and treating said salt with base to provide the compounds I.

The following equations will serve to illustrate the above reaction sequence wherein an N-monosubstituted hydrazone or an N,N'-disubstituted α,ω-dihydrazino alkane bis(azine) [both derived from benzaldehyde] are reacted with phosgene above 10° C.

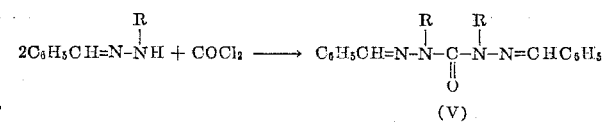

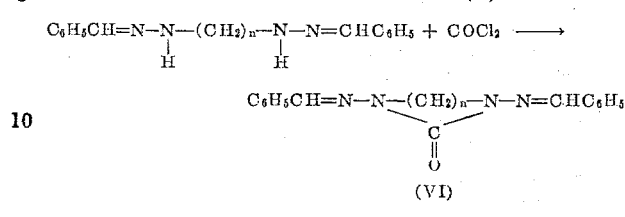

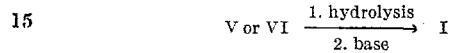

Reaction with phosgene in accordance with the above equations to provide the 2,4-disubstituted carbohydrazide bis(azines) is performed at a temperature range of 10° C. to about 100° C. and preferably at 10°–40° C. The reaction is vigorously exothermic, and external cooling means are advantageously utilized to control the reaction temperature. Again an inert diluent is conveniently employed in this process step, and those mentioned in the preceding discussion are satisfactory. The hydrogen chloride formed during the reaction with phosgene may be taken up by using an excess of the basic reactants themselves, or if desired, an organic base such as a tertiary amine may be utilized for this function. The 2,4-disubstituted carbohydrazide bis(azine) reaction products may be isolated by filtration or centrifugation procedures, and as in the case of the monoazines they are readily purified by appropriate recrystallization procedures. Hydrolysis and subsequent base treatment are performed as described in the above discussion relative to the monoazines to provide the compounds I.

The following examples will serve to illustrate the preparation of the 2,4-disubstituted carbohydrazides I in accordance with this invention.

*Example 1*

Gaseous phosgene (65 g., 0.65 mole) was passed into a stirred solution of 350 g. (2.6 moles) of benzaldehyde methyl hydrazone in 2300 ml. of diethyl ether. The temperature of the reaction mixture was kept at between 12° and 15° C. by means of an ice-salt bath. After standing at room temperature for 15 to 18 hours, the precipitate was separated by suction filtration, and the filter cake was shaken with 1000 ml. of water. The water insoluble portion which was separated, dried, and recrystallized from heptane afforded 120 g. (62% yield) of 2,4-dimethyl carbohydrazide bis(benzazine), M.P. 159°–160° C., as a white crystalline solid.

*Analysis.*—Calcd. for $C_{17}H_{18}N_4O$: C, 69.36; H, 6.16; N, 19.03. Found: C, 69.30; H, 6.16; N, 19.12.

120 g. of 2,4-dimethyl carbohydrazide bis(benzazine) were added to 200 ml. of 6 N hydrochloric acid, and this mixture was steam distilled until the condensate was free of benzaldehyde. The solution contained in the distillation flask was neutralized with aqueous sodium hydroxide and then concentrated to dryness. The residue was heated in absolute alcohol, the solution was filtered, and the alcohol evaporated leaving a semi-solid product from which 2,4-dimethyl carbohydrazide was extracted by acetonitrile. Yield: 29.5 g. (61.5% of the theory). Recrystallization from toluene and finally from ether gave highly pure 2,4-dimethyl carbohydrazide, M.P. 65° C., in the form of colorless, broad needles.

*Analysis.*—Calcd. for $C_3H_{10}N_4O$: C, 30.49; H, 8.53; N, 47.42. Found: C, 30.62; H, 8.53; N, 47.60.

*Example 2*

A rapid flow of phosgene was passed into an agitated solution of 750 g. (5.5 moles) of benzaldehyde methyl hydrazone in 3000 ml. of anhydrous ether until substantial amounts of the phosgene started to collect in the Dry Ice cooled off-gas trap. The temperature was kept at between 0° and 5° C. and not allowed to rise above 10° C. After 15–18 hours, the reaction mixture was filtered, and the filter cake was extracted with hot hexane. The hexane solution was cooled to 0° C., and a total of 509 g. (94° yield) of N-chlorocarbonyl-N-methyl benzaldehyde hydrazone, M.P. 85°–86° C., was collected as a pale tan colored crystalline precipitate.

*Analysis.*—Calcd. for $C_9H_9ClN_2O$: C, 54.97; H, 4.61; Cl, 18.03; N, 14.25. Found: C, 54.86; H, 4.68; Cl, 18.50; N, 14.78.

A slurry of 196.6 g. (1 mole) of N-chlorocarbonyl-N-methyl benzaldehyde hydrazone in 200 ml. of anhydrous ether was added portionwise to a stirred solution of 92 g. (2 moles) of methylhydrazine in 200 ml. of anhydrous ether at a reaction temperature of 10°–20° C. After warming to room temperature, the ether solution was filtered from the precipitated methylhydrazine hydrochloride and concentrated to render crude 2,4-dimethyl carbohydrazide mono benzazine (pure material melts at 144°–145° C.) which was converted to 2,4-dimethyl carbohydrazide by the hydrolysis and base treatment outlined in Example 1.

The 2,4-disubstituted carbohydrazides of this invention are useful pesticides. They are particularly effective herbicides. For instance when applied in either pre-emergence or post-emergence treatment the compounds I are effective in controlling the growth of noxious weeds such as pigweed, mustard and crab grass in the area of wheat, corn and soybean crops.

The compounds I are also useful as crease proofing agents in cellulosic fibers and fabrics. Furthermore upon reaction with formaldehyde under alkaline conditions, the terminal hydrogen atoms are substituted by —$CH_2OH$ groups to provide polyhydroxy compounds which are also useful as crease proofing agents.

Similarly, the 2,4-disubstituted carbohydrazides I have special and valuable utility as chain extenders in the preparation of high molecular weight long chain polyurethanes. Such polyurethanes provided by using the compounds I as chain extenders have a significantly enhanced resistance to degradation upon exposure to common household type bleaches particularly the chlorine containing bleaches. Long chain polyurethane polymers of unique properties have previously been obtained using carbohydrazide as a chain extending agent, but they are susceptible to attack by chlorine containing bleaches. The enhanced utility of the compounds I as chain extenders in long chain polyurethanes is probably due to the substitution of the hydrogen atoms on the amino groups adjacent to the carbonyl group (i.e., the 2 and 4 positions).

What is claimed is:
1. A compound of the formula:

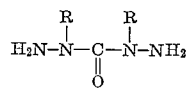

wherein each R is independently selected from the class consisting of alkyl having 1–8 carbon atoms and phenyl.

2. A compound of claim 1 wherein each R is alkyl having 1–8 carbon atoms.

3. 2,4-dimethyl carbohydrazide.

4. A process for preparing 2,4-disubstituted carbohydrazides which comprises:
 (a) reacting phosgene with an N-monosubstituted hydrazone at a temperature range of about —50° C. to 10° C. to provide an N-chlorocarbonyl-N-monosubstituted hydrazone;
 (b) further reacting said N-chlorocarbonyl-N-monosubstituted hydrazone with a monosubstituted hydrazine at a temperature of about 10° C. to about 100° C. to provide a 2,4-disubstituted carbohydrazide monoazine;
 (c) hydrolyzing said monoazine in an acidic medium to provide a salt of a 2,4-disubstituted carbohydrazide and the acid used in said hydrolyzing step; and
 (d) treating said salt with base to provide the desired 2,4-disubstituted carbohydrazide.

5. The process of claim 4 wherein the N-monosubstituted hydrazone reactant is derived from a water insoluble aldehyde or ketone.

6. The process of claim 4 wherein the N-monosubstituted hydrazone reactant is benzaldehyde methylhydrazone.

7. The process of claim 4 wherein the monosubstituted hydrazine utilized is a monoalkylhydrazine.

8. The process of claim 4 wherein phosgene reaction with said N-monosubstituted hydrazone is carried out at 0°–10° C.

9. A process for preparing 2,4-disubstituted carbohydrazides which comprises:
 (a) reacting phosgene with either an N-monosubstituted hydrozone or an N,N'-disubstituted $\alpha,\omega$-dihydrazino alkane bis(azine) at a temperature range of 10° C. to about 100° C. to provide a 2,4-disubstituted carbohydrazide bis(azine);
 (b) hydrolyzing said bis(azine) in an acidic medium to provide a salt of a 2,4-disubstituted carbohydrazide and the acid used in said hydrolyzing step; and
 (c) treating said salt with base to provide the desired 2,4-disubstituted carbohydrazide.

10 The process of claim 9 wherein phosgene reaction is carried out at a temperature range of 10°–40° C.

11. The process of claim 9 wherein said N-monosubstituted hydrozone or N,N'-disubstituted $\alpha,\omega$-dihydrozino alkane bis(azine) reactant is derived from a water insoluble aldehyde or ketone.

12. The process of claim 9 wherein the N-monosubstituted hydrazone reactant is benzaldehyde methylhydrazone.

References Cited by the Examiner

UNITED STATES PATENTS 3,242,044   3/1966   Simkover _____ 260—309.7

ALEX MAZEL, *Primary Examiner.*

HENRY R. JILES, *Examiner.*